UNITED STATES PATENT OFFICE.

PRESTON B. ROSE, OF ANN ARBOR, MICHIGAN.

MANUFACTURE OF FERTILIZERS.

SPECIFICATION forming part of Letters Patent No. 438,646, dated October 21, 1890.

Application filed February 10, 1890. Serial No. 339,907. (No specimens.)

*To all whom it may concern:*

Be it known that I, PRESTON B. ROSE, a citizen of the United States, residing at Ann Arbor, in the county of Washtenaw and State of Michigan, have invented certain new and useful Improvements in the Manufacture of Fertilizers, which I desire to protect by Letters Patent of the United States, which improvements are set forth in the following specification.

In the rendering of lard, tallows, and other fats by steam heat a considerable quantity of water is necessarily formed in the rendering-tanks, and is known in the industry as "tank-water." This tank-water is largely charged with an albuminoid substance containing nitrogen. When such tank-water is evaporated to a sirup or semi-solid consistency, it will still retain quite a large percentage of moisture, and in this condition is now known to rendering-men as "stick." This stick, if evaporated to dryness, is deliquescent. If exposed to the air it absorbs moisture therefrom and again becomes pasty or semi-liquid.

It is the object of my present invention to reduce the stick to a fixed and permanent form, a form in which it does not deliquesce. I have found that this can be done by adding an oxide of iron, either ferrous or ferric, or any insoluble salt of iron to the stick, and after thoroughly incorporating the same to evaporate the mixed stick and the insoluble compound of iron to dryness. In practice I ordinarily place the stick in a proper receptacle, where it may be heated, and have thoroughly incorporated with it from five to thirty per cent., or even a greater amount, of the insoluble compound of iron. The amount of iron to be used will vary with the amount of albuminoids contained in the stick.

Again, the insoluble iron compound may be mixed with lime or other alkaline earth or their salts, or with a caustic alkali or salt of the same, either before or after mixing with the stick. Again, I may add a soluble salt of iron to the stick, and then to render the iron insoluble in the stick add a sufficient quantity of an alkali or alkaline earth to precipitate all of the iron. The mixed stick and chemicals are now evaporated to dryness by any convenient method and, finally, pulverized or ground to a powder.

The relative amount of the iron and stick will need to be varied according to the percentage of solid matter present in the stick.

I claim—

1. The process of converting stick or other albuminoid into a fertilizer, which consists in mixing therewith an insoluble compound of iron and evaporating the mass to dryness, substantially as described.

2. The herein-described process of converting stick or other albuminoid into a fertilizer, which consists in adding thereto an insoluble compound of iron mixed with an alkaline earth or its salt, or an alkali or a salt of the same, and evaporating the mass to dryness, substantially as described.

3. The herein-described process of converting stick or other albuminoid into a fertilizer, which consists in adding thereto a soluble salt of iron and then adding an alkaline earth or an alkali or their salts sufficient to precipitate the iron and evaporating the mass to dryness, substantially as described.

PRESTON B. ROSE.

Witnesses:
C. C. LINTHICUM,
FREDERICK C. GOODWIN.